United States Patent Office 3,358,446
Patented Dec. 19, 1967

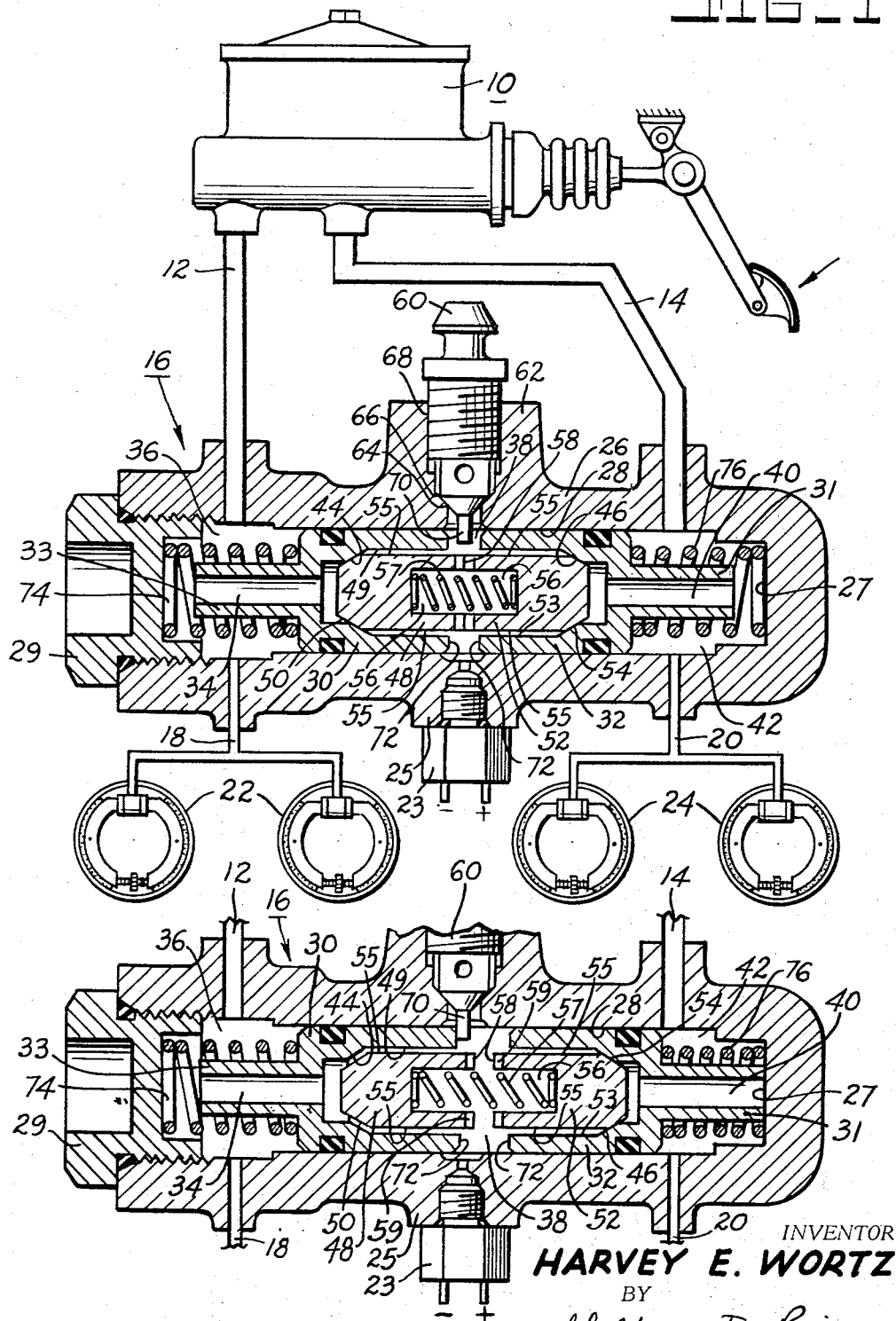

3,358,446
BRAKE WARNING DEVICE
Harvey E. Wortz, St. Joseph, Mich., assignor to The Bendix Corporation, a corporation of Delaware
Filed Oct. 22, 1965, Ser. No. 500,702
5 Claims. (Cl. 60—54.5)

This invention concerns a device for warning a vehicle operator that one set of brakes in a split system has failed.

In a vehicle having a split system master cylinder, two separate fluid systems connect the master cylinder to a respective set of brakes for simultaneously actuating the same. When one set of brakes fail, the other set of brakes still operate. While there is a pedal loss and a vehicle operator must press harder on the brake pedal to stop the vehicle, it is not assured that the operator will realize he has lost one set of brakes.

Accordingly, it is an object of this invention to provide a split brake system with a device that will warn the operator of brake failure.

Other objects of this invention will become apparent from the following description with reference to the drawings wherein:

FIGURE 1 is a schematic view of a split brake system illustrating a valve in cross-section; and FIGURE 2 is a view of the valve of FIGURE 1 shown in a signal actuating position.

Referring to the drawing, a well known split system master cylinder 10, such as the type illustrated and described in U.S. Patent No. 3,149,468, is shown in full. A pair of conduits 12 and 14 connect a respective one of a pair of actuating chambers of the master cylinder with a valve 16, and conduits 18 and 20 connect the valve 16 with a pair of front brake assemblies 22 and a pair of rear brake assemblies 24, respectively.

The valve 16 comprises a housing 26 having a bore 28 therein being closed at one end by a wall 27 and at the other end by a plug 29. A well known fluid actuated switch 23 is secured in a boss 25 and is communicated to the bore 28. The switch 23 may be connected to any type of warning mechanism, for instance, a light or buzzer for actuating the same. A pair of sleeves 30 and 32 are slidably disposed in the bore with the sleeve 30 having a tubular portion 31 defining a passage 34 which communicates a front brake chamber 36 with a switch actuating chamber 38, communicated with the switch 23, and the sleeve 32 having a tubular portion 33 defining a passage 40 which communicates a rear brake chamber 42 with the switch actuating chamber 38. A conical valve seat 44 is located on the sleeve 30, and a conical valve seat 46 is located on the sleeve 32. A poppet valve member 48 is located in a bore 49 of the sleeve 30 and is slidably carried by the sleeve 30 and has a conical end 50 for sealingly engaging the seat 44. A poppet valve member 52 is located in a bore 53 of the sleeve and is slidably carried by the sleeve 32 and has a conical end 54 for sealingly engaging the seat 46. Each of the poppet members are circular shaped to be slidably guided in their respective sleeve bores 49 and 53 and are provided with flats 55 spaced from the wall of their respective sleeves 30 and 32 to provide fluid paths therebetween. A recess 56 and an annular abutment end surface 58 surrounding the recess 56 are provided on each poppet member. Each of the sleeves are identical in shape and size, and each of the poppets are identical in shape and size. A coiled compression spring 57 extends into the recess 56 in each poppet member 48 and 52 and acts on the closed end of each recess to urge the poppet members 48 and 52 away from each other into engagement with their respective seats. A slot 59 is provided in each end of the poppets 48 and 52 to communicate the recess 56 to the chamber 38.

A bleeder screw 60 is secured in an outlet boss 62 and has a conical end 64 seated on a conical seat 66 sealing off an opening 68, which extends through the screw to atmosphere, from the switch actuating chamber 38. A pin 70 is provided on the bleeder screw 60 and projects into the switch actuating chamber 38 to serve as a stop against which either of abutting ends 72 of the sleeves 30 and 32 engage under a condition to be explained below. A coil spring 74 is located in the front brake chamber 36 and acts on the sleeve 30 to urge the sleeve 30 and thereby the poppet 48 toward the poppet 52, and a coil spring 76 is located in the rear brake chamber 42 acting on the sleeve 32 to urge the sleeve 32 and thereby the poppet 52 toward the poppet 48. The springs 74 and 76 are of equal spring rate. The ends 58 of the poppet members project beyond the ends 72 of the sleeves 30 and 32 so that the abutting surfaces 58 will engage each other when the sleeves 30 and 32 are urged toward one another, thereby maintaining the poppets seated and the switch actuating chamber 38 cut off from the braking chambers 36 and 42.

Operation

In operation, when the master cylinder 10 is actuated, equal braking pressure is communicated by conduits 12 and 14 from the master cylinder 10 to the front braking chamber 36 and the rear braking chamber 42, respectively, and is communicated from the chambers 36 and 42 by conduits 18 and 20 to the front set of brakes 22 and the rear set of brakes 24. Since the areas on the sleeves 30 and 32 and on the poppets 48 and 52 exposed to the respective chambers 36 and 42 are equal, the spring force of springs 74 and 76 is equal and the pressures in chambers 36 and 42 are equal, the sleeves 30 and 32 and the poppets will remain in the same position as shown in FIGURE 1. Therefore, the switch actuating chamber 38 will remain cut off from the braking chambers 38 and 42 and the switch 23 will remain inactivated.

Referring to FIGURE 2, and assuming there has been leakage of fluid from the system connecting the master cylinder 10 with the brakes 24 resulting in failure of the rear set of brakes 24, only the front braking chamber 36 of the valve 16 will be pressurized thereby unbalancing the forces acting on the sleeves 30, 32 and the poppets 48 and 52. The pressure in chamber 36 acting on poppet 48 will thrust the poppet 48, poppet 52 and sleeve 32 to the right against the force of spring 76. The sleeve 30 will also be forced by the pressure in chamber 36 to follow movement of the poppet 48 to the right until it engages stop pin 70 at which time the poppet 48 unseats to open passage 34 to communicate the switch actuating chamber 38 with the front braking chamber 36. Fluid travels past the conical end 50 of the poppet and the space between the flats 55 and the wall of the bore 49 into the chamber 38 and through the slots 55 into the recess 56, whereby the pressure acts on the sleeve 32 forcing it to the right into engagement with the end 27 of the bore 28 and the fluid pressure in chamber 56 and the spring 57 act on the left hand side of the poppet to keep the poppet engaged on seat 46 and maintain the chambers 38 and 42 cut off from each other.

Upon introduction of pressure in chamber 38, the switch 23 will be activated thereby actuating a warning signal to the vehicle operator. When the sleeve 32 has engaged the end 27 of the bore 28 and the pressure in chambers 38 and 36 equalizes, the spring 57 will engage the poppet 48 with the seat 44. Upon release in braking pressure in chamber 36, the pressure in chamber 38 and the spring 57 will maintain the poppet 48 seated, trapping fluid in the chamber 38. The springs 74 and 76 will force the sleeves 30 and 32 and thereby the poppets 48 and 52 toward one another, placing the fluid in chamber 38 under pressure which maintains the switch 23 activated. The sleeves 30, 32 and poppets 48, 52 will remain in the same relative positions as shown in FIGURE 2, but will be shifted to the left as a unit until the force of springs 74 and 76 equalize each other.

The switch 23 will remain activated regardless of the number of brake applications until the pressure has been relieved in chamber 38 by unseating the conical end 64 of the bleeder screw, thereby communicating chamber 38 to atmosphere.

If there was failure of the front set of brakes instead of the rear set of brakes, then the poppet 52 will be unseated, the sleeve 32 will engage stop pin 70, and the sleeve 30 will engage the plug 29 with the function being the same as for failure in the rear set of brakes 24.

It is my intention to include within the scope of the following claims all equivalent applications of the invention whereby the same or substantially the same results may be obtained.

I claim:

1. A split brake system comprising: a split system master cylinder having first and second actuating chambers therein; first and second brake assembly means; a valve having a first fluid chamber, a second fluid chamber and a third fluid chamber; a pressure responsive member communicated to said third chamber; first conduit means communicating said first actuating chamber, said first fluid chamber and said first brake assembly means with each other; second conduit means communicating said second actuating chamber, said second fluid chamber and said second brake assembly means with each other; said valve further comprising means for normally maintaining said first, second and third chambers cut off from each other, for communicating said third fluid chamber with said first fluid chamber upon failure of fluid pressure in said second fluid chamber when said first fluid chamber is pressurized and for communicating said third fluid chamber with said second fluid chamber upon failure of fluid pressure in said first chamber when said second fluid chamber is pressurized, and thereafter trapping fluid in said third chamber under sufficient pressure to maintain said pressure responsive member activated.

2. A valve for use in a brake system comprising: a housing having a bore therein, a first slidable member located in said bore and separating said bore into a first braking chamber and a switch actuating chamber, a second slidable member located in said bore and separating said actuating chamber from a second braking chamber, a fluid operated switch communicated to said switch actuating chamber, first passage means in said first slidable member communicating said first chamber and said actuating chamber, second passage means in said second slidable member communicating said second chamber with said actuating chamber, each of said passage means including a valve seat, valve means in each of said passage means arranged to normally close its respective passage means, said valve means being arranged to open one passage means communicated with one braking chamber when pressure has failed in the other braking chamber and to close when pressure in said one braking chamber substantially equalizes the pressure in said switch actuating chamber to thereby actuate said switch and trap fluid in said switch actuating chamber, and means urging said slidable members toward each other to maintain the fluid trapped in said switch actuating chamber compressed to maintain said switch in actuated condition.

3. A valve for use in a brake system comprising: a housing having a bore therein, a first slidable member located in said bore and separating said bore into a first braking chamber and a switch actuating chamber, a second slidable member located in said bore and separating said actuating chamber from a second braking chamber, a fluid operated switch communicated to said switch actuating chamber, first passage means in said first slidable member communicating said first chamber and said actuating chamber, second passage means in said second slidable member communicating said second chamber with said actuating chamber, each of said passage means including a valve seat, first and second valve members, said first valve member being slidably carried by said first slidable member and arranged to engage said seat on said first slidable member to close said first passage means when urged in a direction away from said second slidable member relative to said first slidable member, said second valve member being slidably carried by said second slidable member and arranged to engage said seat on said second slidable member to close said second passage means when urged in a direction away from said first slidable member relative to said second slidable member, said valve members being arranged to abut each other, means biasing said valve members in the opposite directions, means stronger than said biasing means urging said slidable members toward each other and thereby maintaining said valve members against each other and seated, stop means limiting movement of said first slidable member in a direction towards said second slidable member and limiting movement thereof in the opposite direction, and stop means limiting movement of said second slidable member in a direction towards said first slidable member and limiting movement thereof in the opposite direction.

4. The structure as recited in claim 3 wherein said urging means is a first spring in said first braking chamber acting on said first and second slidable members, respectively, to urge the same in opposite directions, and said biasing means is a spring which is weaker than said first or second springs.

5. The structure as recited in claim 4 wherein a bleeder screw is communicated to said switch actuating chamber, and said stop means limiting movement of each of said slidable members toward each other is a stop pin integral with said screw and extending into said switch actuating chamber between said slidable members.

References Cited

UNITED STATES PATENTS 3,228,194   1/1966   Blair _____ 60—54.5

MARTIN P. SCHWADRON, *Primary Examiner.*

R. R. BUNEVICH, *Assistant Examiner.*

PO-1050
(5/69)

UNITED STATES PATENT OFFICE
CERTIFICATE OF CORRECTION

Patent No. 3,358,446            Dated    December 19, 1967

Inventor(s)    Harvey E. Wortz

It is certified that error appears in the above-identified patent and that said Letters Patent are hereby corrected as shown below:

Column 4, Line 43, after "chamber" insert --and a second spring in said second braking chamber".

SIGNED AND
SEALED
FEB 24 1970

(SEAL)
Attest:

Edward M. Fletcher, Jr.
Attesting Officer

WILLIAM E. SCHUYLER, JR.
Commissioner of Patents